Patented Jan. 16, 1945

2,367,269

UNITED STATES PATENT OFFICE 2,367,269

CITRUS OIL FLAVORING MATERIALS

Chester H. Epstein, Highland Park, and Nathan R. Gotthoffer, Grayslake, Ill., assignors to Grayslake Gelatin Co., Grayslake, Ill., a corporation No Drawing. Application April 23, 1942, Serial No. 440,197

6 Claims. (Cl. 99—140)

This invention relates to a method for conserving citrus oil flavoring materials and to a novel product which is obtained as a result of carrying out the process herein described. More particularly, the invention is concerned with the conservation of such oils or oil flavoring materials as may be used in conjunction with gelatin as, for example, "oil of orange," "oil of lime," etc.

These oils are derived from the peel of the citrus fruits which contains appreciable quantities of such peel oil. There are several processes available for the production of such oils, one of the commonest consisting in crushing the whole fruit between rollers, screening the resultant mixture of juice and oil and then separating the oil from the juice by centrifuging.

Extensive analyses of these oils have been made. Orange oil, for example, has been reported to consist "chiefly of d-limonene, which comprises 90 percent or more of the oil; decylic aldehyde, 1-2 percent; and small quantities of formic, acetic, capric and caprylic acids; and an olefin alcohol closely related to linalool." No pinene was found in orange oil although this substance is present in lemon oil.

These oils, under certain conditions which are not as yet fully understood, are subject to change during storage, as a result of which they develop what is known as a terpene flavor. This development of terpene flavor is commonly believed to be associated with oxidation of the limonene and decomposition of the other constituents of the oil in the presence of air, acid and water. Oil of orange appears to be more particularly susceptible to the development of such terpene flavor. Our invention is directed particularly to the retardation of such terpene flavor development. We are aware that various anti-oxidants have been suggested for this purpose but with such anti-oxidants our invention is not concerned.

In a previous invention, U. S. 2,258,567, we described a method for conserving flavoring materials which consisted in dissolving or dispersing the flavoring material in a concentrated gelatin solution and then congealing and drying the resultant mixture. While this procedure serves to conserve the essence of the flavoring material in the final composition, we have found, however, that in the case of the citrus oils, the development of the terpene flavor is neither prevented nor appreciably retarded.

We have now found that the development of the terpene flavor may be retarded to a considerable extent by the addition of an acid material or substance having acidic properties to the mixture of gelatin and flavoring material. This procedure, it will be noted, is contradictory to the theory that the development of the terpene flavor is favored by the presence of acid. This acidic substance, which should be edible, may be added to the gelatin solution prior to the addition of the flavoring material or may be added to the mixture after the dispersion of the oil flavoring material in the gelatin solution.

As an example of the carrying out of our process the following description is given:

Example 1

100 pounds of pure food gelatin are dissolved in 60 gallons of hot water. The resultant solution is then cooled to 120° F. or lower whereupon 10 pounds of citric acid are added and dissolved in the gelatin solution. One gallon of orange oil extract flavoring material is then added and thoroughly incorporated. The orange oil mixes will with the aqueous gelatin solution becoming thoroughly emulsified and does not rise to the surface. The flavored and acidified gelatin solution is then immediately spread in thin sheets by running onto a belt and cooling under refrigeration to congeal the material. The congealed sheets are then cut, placed on trays and dried by exposure to a current of air. The dried sheets are then crushed and ground to desired size.

As noted above, this description is given merely by way of example of the carrying out of our process and is by no means to be considered as limiting except as hereinafter described. The product is a dry mass wherein the gelatin and acid are present in a single phase relationship as a protective matrix material in which the orange oil is housed in dispersed form and in a second phase. We do not limit ourselves to the particular flavoring material or to the amounts thereof in proportion to the gelatin described in this example, but may use any of the citrus oil flavoring materials in any amounts desired in proportion to the gelatin, provided such amounts do not interfere with the carrying out of our process as described. Moreover, we do not limit ourselves to the particular method of congealing and drying the material as described above but may employ any known method of preparing the material in dry form. Because the acid substance will tend to destroy the gel strength of the gelatin, particularly at elevated temperatures, it is, however, advisable to congeal and dry the acidified mixture of flavoring and gelatin as rapidly as possible.

As regards the quantity of acidic substance required to accomplish the desired result of retarding the development of the terpene flavor, we have found that very little retardation of the terpene flavor occurs until the pH value of the solution is 4.2 or lower. Better results are obtained when the pH of the gelatin solution lies between 3.0 and 4.0. The amount of acidic material added cannot be excessive because of the possible destructive effect of the acid on the gel strength of the gelatin, said effect being rapidly increased as the pH value is lowered.

Since flavoring materials are usually employed in conjunction with colors, such coloring agents as, for example, certified food colors, may be added to the gelatin solution. Finally, small quantities of sugar or salt or like ingredients may be added to the mixture and we consider such additions as coming within the scope of our invention so long as they have no effect on the conservation of the flavoring material and the retardation of the terpene flavor.

What we claim as new and desire to secure by United States Letters Patent is:

1. The method of conserving citrus oil flavoring material and retarding the development of a terpene flavor therein, which comprises dissolving food gelatin and solid edible acid material in water while forming a gelatin solution having a pH in the range from 3.0 to 4.2, forming a dispersion in said solution of material containing essentially citrus flavoring oil, and converting the resulting dispersion into dry gelatin form, whereby the citrus oil is housed in and protected by the resulting acidified gelatin mass.

2. The method of conserving citrus oil flavoring material and retarding the development of a terpene flavor therein, which comprises dissolving food gelatin and citric acid in water while forming a gelatin solution having a pH in the range from 3.0 to 4.2, forming a dispersion in said solution of material containing essentially citrus flavoring oil, and converting the resulting dispersion into dry gelatin form, whereby the citrus oil is housed in and protected by the resulting acidified gelatin mass.

3. The method of conserving orange oil flavoring material and retarding the development of a terpene flavor therein which comprises dissolving food gelatin and citric acid in water while forming a gelatin solution having a pH in the range from 3.0 to 4.2, forming a dispersion in said solution material containing essentially orange oil, and converting the resulting dispersion into dry gelatin form, whereby the orange oil is housed in and protected by the resulting acidified gelatin mass.

4. A flavored food product comprising essentially a dry mass of food gelatin and solid edible acid material in quantity to provide upon dissolution of said mass in water an acid gelatin solution of pH in the range from 3.0 to 4.2, said mass being a single phase with respect to said gelatin and said acid material, and further comprising dispersed throughout and within said dry mass flavoring material including essentially citrus flavoring oil, the said product being characterized in that it does not develop a terpene flavor during appreciable storage periods.

5. A flavored food product comprising essentially a dry mass of food gelatin and citric acid in quantity to provide upon dissolution of said mass in water an acid gelatin solution of pH in the range from 3.0 to 4.2, said mass being a single phase with respect to said gelatin and said citric acid, and further comprising dispersed throughout and within said dry mass flavoring material including essentially citrus flavoring oil, the said product being characterized in that it does not develop a terpene flavor during appreciable storage periods.

6. A flavored food product comprising essentially a dry mass of food gelatin and citric acid in quantity to provide upon dissolution of said mass in water an acid gelatin solution of pH in the range from 3.0 to 4.2, said mass being a single phase with respect to said gelatin and said citric acid, and further comprising dispersed throughout and within said dry mass flavoring material including essentially orange oil, the said product being characterized in that it does not develop a terpene flavor during appreciable storage periods.

CHESTER H. EPSTEIN.
NATHAN R. GOTTHOFFER.